(12) United States Patent  (10) Patent No.: US 7,669,580 B2
Silbernagel et al.  (45) Date of Patent: Mar. 2, 2010

(54) ELECTRONIC ENGINE SPEED CONTROL SYSTEM FOR GRASS MOWING MACHINE

(75) Inventors: Carl Steven Silbernagel, Fort Mill, SC (US); John Boyd Kuhn, Rubicon, WI (US); Harlin J. Trefz, Jackson, TN (US); Donald William Ertmer, Lodi, WI (US)

(73) Assignee: Deere & Company, Moline, IL (US)

( * ) Notice: Subject to any disclaimer, the term of this patent is extended or adjusted under 35 U.S.C. 154(b) by 159 days.

(21) Appl. No.: 12/053,961

(22) Filed: Mar. 24, 2008

(65) Prior Publication Data

US 2009/0235627 A1 Sep. 24, 2009

(51) Int. Cl.
*F02D 41/02* (2006.01)
*F02D 41/00* (2006.01)

(52) U.S. Cl. ....................... 123/352; 123/319
(58) Field of Classification Search .......... 123/352, 123/319, 350, 480; 701/54; 56/10.2 G, 10.2 R; 180/336

See application file for complete search history.

(56) References Cited

U.S. PATENT DOCUMENTS 4,727,710 A * 3/1988 Kuhn ................. 56/10.2 G

2006/0021312 A1 * 2/2006 Brandon et al. .......... 56/10.2 R

FOREIGN PATENT DOCUMENTS

| DE | 102007003956 | 11/2007 |
| EP | 1472927 | 11/2004 |
| JP | 2006082770 | 3/2006 |
| WO | 2004085752 | 10/2004 |

* cited by examiner

*Primary Examiner*—Mahmoud Gimie

(57) ABSTRACT

An electronic engine speed control system for a grass mowing machine powered by an internal combustion engine includes a microcontroller providing an output signal to an engine speed actuator for the engine, a pedal position sensor connected to a foot pedal and providing a voltage input signal to the microcontroller based on the position of the foot pedal, a PTO clutch switch providing a signal input to the microcontroller indicating if a PTO clutch is engaged, and a lever position sensor connected to a hand lever and having a range of positions including an Automatic mode position and a plurality of Manual mode positions. The hand lever position sensor provides a voltage input signal to the microcontroller in the Automatic mode position such that the microcontroller output to the engine speed actuator is related to the voltage inputs from the pedal position sensor and PTO clutch switch, and provides a voltage input signal to the microcontroller in a range of Manual mode positions such that the microcontroller output to the engine speed actuator is related to the voltage input from the lever position sensor.

20 Claims, 2 Drawing Sheets

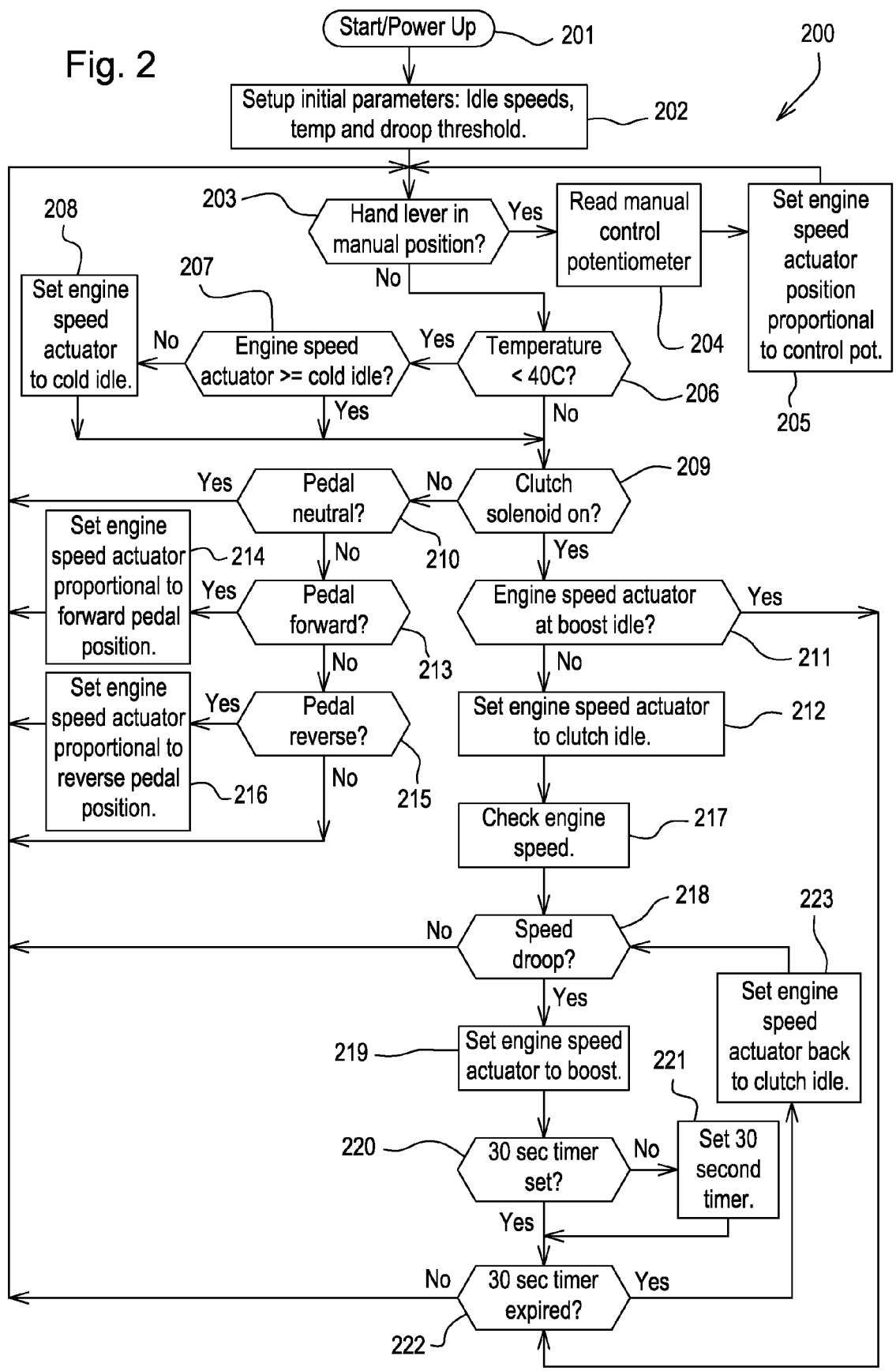

ELECTRONIC ENGINE SPEED CONTROL SYSTEM FOR GRASS MOWING MACHINE

FIELD OF THE INVENTION

This invention relates generally to controls for grass mowing machines and other lawn care vehicles, and specifically to an electronic engine speed control system for such machines.

BACKGROUND OF THE INVENTION

Riding lawn equipment, compact tractors, commercial mowers, and golf and turf mowing equipment are typically powered by internal combustion engines. These machines include engine speed controls that an operator may use to regulate the rate at which fuel is supplied to the engine. The engine speed controls may include a lever near the operator's seat, and the lever may be connected to a push/pull cable or mechanical linkage that controls the throttle position of a gasoline engine, or the fuel injectors on a diesel engine. A governor may be provided between the cable or linkage and the throttle or fuel injectors. The engine speed, or rotational rate of the engine, may be proportional to the position of the engine speed controls depending on the load.

In the past, many grass mowing machines also have included infinitely variable hydrostatic transmissions to control direction and the drive ratio of the vehicle. For example, the hydrostatic transmission may be controlled with one or a pair of foot operated pedals. Depressing a foot pedal causes the vehicle to move forward or reverse and, at a given engine speed, the travel speed of the vehicle may be proportional to the distance the pedal is depressed.

Controls for engine speed and the hydrostatic transmission are not linked, but are controlled separately. This adds to the complexity of operating the equipment. To simplify operation, some operators may set the engine speed control so that the engine is at a fast idle, and control vehicle travel speed only with the transmission. As a result, an operator may run the engine at a higher speed than is necessary or desirable. Running the engine at a high speed may waste fuel, and create unnecessary noise and vibration which may be undesirable to the operator and bystanders.

An additional problem with separate controls for the engine speed and hydrostatic transmission occurs when a power take-off (PTO) is engaged to the engine. Mower decks, tillers, and other attachments may be driven by a PTO. These attachments are heavy loads on the engine, and it is important to operate them at a fast engine speed. However, some operators do not properly and sufficiently increase the engine speed when operating attachments.

Accordingly, a simplified control system is needed for an operator to control the engine speed of a lawn and garden tractor, compact tractor, commercial mower, or golf and turf mowing machine. An electronic engine speed control system is needed that, based on the desired vehicle speed, can set an engine speed actuator so that the engine runs at an optimal speed that does not waste fuel or create unnecessary noise and vibration. An electronic engine speed control system is needed that can help assure that attachments and implements driven by the PTO of a lawn and garden tractor are operated at an appropriate and sufficient engine speed.

SUMMARY OF THE INVENTION

An electronic engine speed control system for a grass mowing machine such as a lawn and garden tractor or similar vehicle sets the position of an engine speed actuator based on electronic signals from a pedal position sensor, a hand lever position sensor, an engine speed sensor, an engine temperature sensor, and a PTO clutch switch. As the operator depresses the foot pedal, the engine speed actuator position moves proportionally. If the operator engages the PTO, the engine speed is increased automatically.

BRIEF DESCRIPTION OF THE DRAWINGS

FIG. 2 is a logic flowchart showing the operation of the electronic engine speed control system according to one embodiment of the invention.

DESCRIPTION OF THE PREFERRED EMBODIMENT

Figure 1:
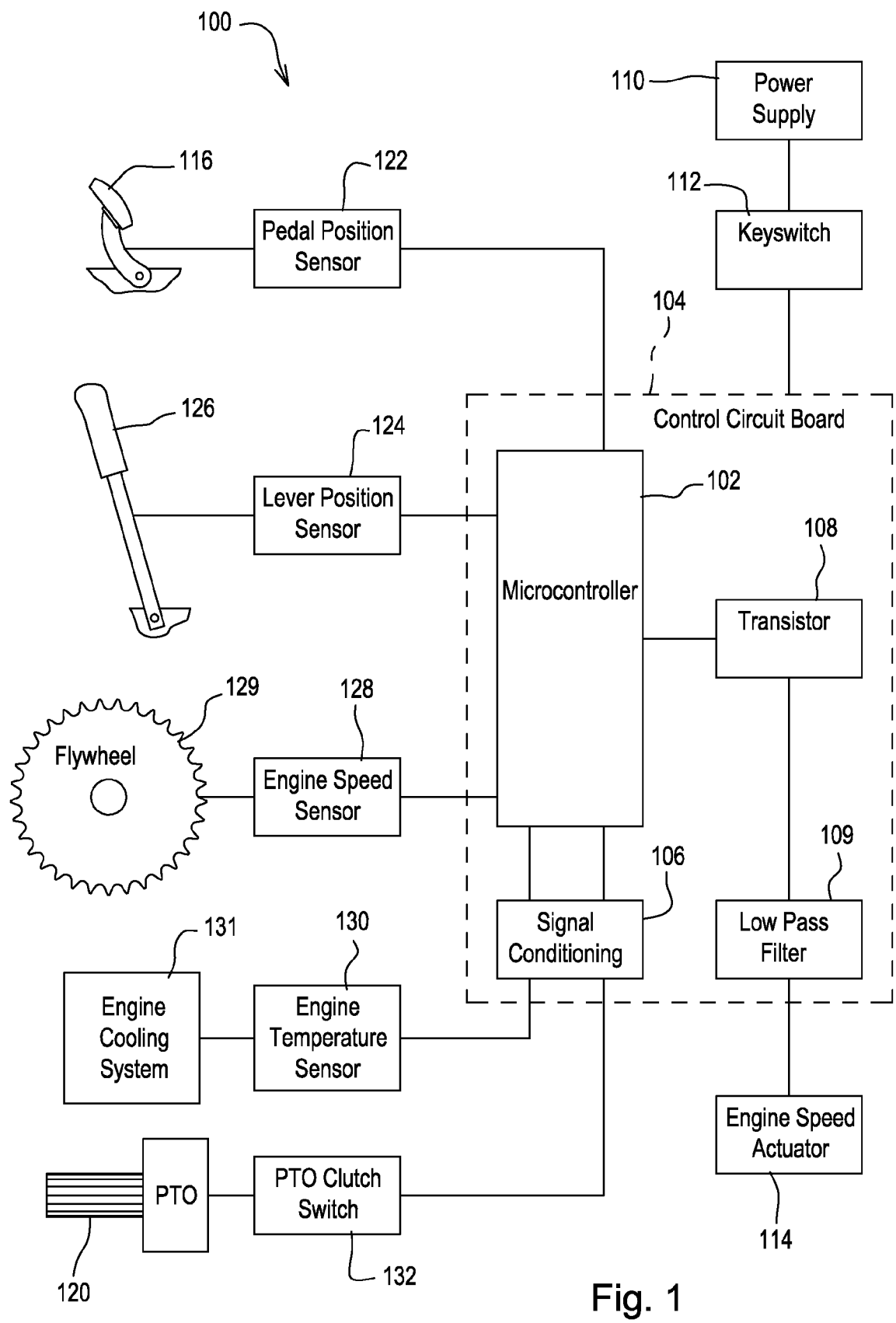
FIG. 1 is a block diagram of an electronic engine speed control system according to a first embodiment of the invention.

A first embodiment of electronic engine speed control system 100 is shown in the block diagram of FIG. 1. The electronic engine speed control system includes microcontroller 102 such as a PIC 16F876 or similar device which may reside on control circuit board 104. The control circuit board may be mounted on a grass mowing machine such as a lawn and garden tractor, and electrically connected to power supply 110 through key switch 112 so that the electronic engine speed control system operates once the internal combustion engine on the machine has been started. The power supply may provide 12 volts through the keyswitch to a 5 volt power supply regulation stage of the microcontroller.

In one embodiment, the electronic engine speed control system may be operated in a Manual mode or an Automatic mode. The operator may select the mode by using hand lever 126. The hand lever may be connected to hand lever position sensor 124 which monitors and/or senses the position of the hand lever, and provides a corresponding voltage input signal to the microcontroller. For example, an operator may select the Manual mode by moving the hand lever to anywhere between a minimum engine speed position and a maximum engine speed position. Alternatively, an operator may select the Automatic mode by moving the hand lever to an Automatic mode position which may be located below the Manual mode minimum engine speed position. A mechanical detent may be provided to separate and distinguish the Automatic mode position from the range of Manual mode positions.

In one embodiment, the hand lever sensor may be a Hall rotary position sensor or potentiometer that provides an analog voltage signal input to the microcontroller in a range between about 0.5 and about 4.5 Volts DC based on the position of the hand lever. Most of the voltage input range may specify the position of the hand lever in the Manual mode, and the remainder may indicate the hand lever is in the Automatic mode.

In one embodiment, if the microcontroller receives a voltage input from hand lever position sensor 124 in the part of the range designated for Manual mode, the microcontroller is programmed to provide an output to engine speed actuator 114 setting the engine speed actuator position proportional to the hand lever position. The engine speed actuator may include a governor that controls the fuel supplied by a throttle or fuel injectors. For each engine speed actuator position, the engine speed may vary depending on the load. If the voltage reading from the hand lever position sensor shows the hand lever is in the Automatic mode (for example, a voltage outside the Manual mode part of the range), the microcontroller is programmed to provide an output to the engine speed actuator based on the foot pedal position, as described below.

In one embodiment, the electronic engine speed control system includes foot pedal 116 connected to pedal position sensor 122. The foot pedal may be a single foot pedal that provides forward, neutral and reverse functionality, or a forward foot pedal and a reverse pedal may be used. If the hand lever is in the Automatic mode position, the pedal position sensor monitors and/or senses the position of the foot pedal or the hydrostatic transmission control arm connected to the pedal, and provides a corresponding voltage input signal to the microcontroller.

In one embodiment, in the Automatic mode, the microcontroller is programmed to provide an output to the engine speed actuator proportional to foot pedal position. At any engine speed actuator position, the engine speed may vary depending on the load. The pedal position sensor may be a Hall rotary position sensor providing an analog voltage signal input to the microcontroller in a range of about 0.5 to about 4.5 Volts DC, depending upon how far the operator depresses the foot pedal from the idle position. In the neutral position, for example, the pedal position sensor input signal may be about 2.5 volts, with a dead band window of about +/−0.05 volts. As the pedal is depressed to go forward, the pedal position sensor input signal increases above the neutral dead band window, and as the pedal is depressed to go in reverse, the pedal position input sensor signal decreases below the neutral dead band window.

In one embodiment, foot pedal 116 may be mechanically or electrically connected to a hydraulic pump of a continuously variable hydrostatic transmission to provide traction drive for the grass mowing machine. If the hand lever is in either the Automatic mode or Manual mode, depressing the foot pedal changes the swash plate angle to increase the drive ratio of the hydraulic pump which may increase travel speed of the machine. In the Automatic mode, the foot pedal also affects the engine speed actuator through the pedal position sensor and microcontroller.

However, in the Manual mode, the foot pedal controls only the hydrostatic transmission. In the Manual mode, the pedal position sensor is not used by the microcontroller to affect the engine speed actuator. Instead, in the Manual mode, only the hand lever controls the engine speed actuator.

In one embodiment, the electronic engine speed control system includes engine temperature sensor 130 that monitors and/or senses the temperature of the engine via engine cooling system 131, and provides a corresponding voltage input to the microcontroller. For example, the engine temperature sensor may provide a 12 volt signal that signal conditioner 106 may convert to an analog voltage signal input of between about 0 and about 5 volts to the microcontroller. If the signal from the engine temperature sensor indicates engine temperature is below a specific temperature such as 40 degrees Centigrade, for example, the microcontroller may be programmed to provide an output to set the engine speed actuator at a "cold-idle" position. If the engine temperature remains below 40 degrees C., the microcontroller may be programmed to continue providing an output holding the engine speed actuator at the cold-idle position.

In one embodiment, the electronic engine speed control system includes PTO clutch switch 132 that provides a switch state input signal to the microcontroller through signal conditioner 106. For example, the PTO clutch switch may include 12 to 5 volt signal conditioning, and may provide a digital signal to the microcontroller of 0 or 5 volts. If the PTO clutch switch indicates PTO 120 is engaged while hand lever 126 is in the Automatic mode, the microcontroller may be programmed to provide an output to move the engine speed actuator to a "clutch-idle" position in an effort to increase engine speed regardless of the foot pedal position. For example, the clutch idle position may be a preferred engine speed of about 3250 rpm. If the PTO clutch switch indicates the PTO is engaged while hand lever 126 is in the Manual mode, the microcontroller does not alter the engine speed actuator position.

In one embodiment, the electronic engine speed control system includes engine speed sensor 128 that monitors and/or senses the rotational speed of flywheel 129 and provides a corresponding voltage input to the microcontroller. For example, the engine speed sensor may be a Hall gear tooth switch providing a digital signal input of 6800 pps to the microcontroller. If the signal from the engine speed sensor droops below a specified threshold speed, the microcontroller may be programmed to provide an output to the engine speed actuator in an effort to boost engine speed.

For example, the microcontroller may set the engine speed actuator for a preferred or clutch-idle engine speed of approximately 3250 rpm with the PTO engaged. If the engine speed sensor indicates engine speed has drooped below a threshold (such as 3100 rpm) due to a heavy load, the microcontroller is programmed to provide a signal to the engine speed actuator in an effort to boost engine speed. For example, the microcontroller may move the engine speed actuator to a full throttle or maximum position, which may boost the engine speed by about 300 rpm. However, if there is a heavy load on the engine, the boost may not increase engine speed back up to the preferred engine speed, or may not increase engine speed by 300 rpm, but may only increase engine speed slightly, or not at all. The microcontroller may move the engine speed actuator to a full throttle or maximum speed position, regardless of how much below the engine droops. The boost may simply prevent the engine speed from drooping too much. The boost may be a single step up, and may not be proportional to a preceding drop in engine speed.

Additionally, in one embodiment, after a specified time interval such as 30 seconds, the microcontroller may provide an output returning the engine speed actuator to the previous position where the engine was at the preferred speed of 3250 rpm. However, if the microcontroller again receives input from the engine speed sensor indicating engine speed has drooped under 3100 rpm, the microcontroller will provide an output to the engine speed actuator to boost engine speed again for a predetermined and fixed time period.

In one embodiment, the electronic engine speed control system includes an output circuit from the microcontroller to the engine speed actuator. The output circuit may include transistor 108 and low pass filter 109. For example, the transistor may be an NPN 2N3904 transistor receiving a pulse width modulated output signal at 4 kHz from the microcontroller, and the low pass filter may provide an analog signal of between 0 and 12 volts to engine speed actuator 114.

In one embodiment of the electronic engine speed control system, "low-idle" is defined as the engine speed actuator position for the lowest engine speed at typical engine operating temperatures. "Cold-idle" is the engine speed actuator position for the lowest engine speed while engine temperature is below a specific temperature such as 40 degrees Centigrade. "Clutch-idle" is the engine speed actuator position for a specified or preferred initial engine speed if the PTO is engaged, and the engine will stay at this speed unless engine droop occurs. "High-idle" is the engine speed actuator position for the fastest engine speed that may be set in Manual mode, or if the foot pedal is fully depressed in Automatic mode with the PTO disengaged. The "droop/threshold speed" is the critical engine speed while the PTO is engaged. If the engine speed droops below the droop/threshold speed, the electronic engine speed control system will trigger the Engine droop/boost feature. "Engine boost" is the amount of additional engine speed actuator movement provided by the microcontroller to keep engine speed above the droop/threshold speed.

FIG. 2 is a logic flowchart showing the operation of the electronic engine speed control system according to one embodiment of the invention. The logic may be a series of steps implemented by software residing in the microcontroller.

In block 201, the electronic engine speed control system is started and powered up. In block 202, initial parameters are set up and/or retrieved from a memory storage location in the microcontroller. The initial parameters may include the position of the engine speed actuator for each of the various idle speeds, the temperature threshold, droop/threshold speed, etc. Following the start and setup, the logic of the software may run on the microcontroller at periodic time intervals or clock cycles.

In block 203, the microcontroller obtains a voltage input from hand lever position sensor 124 indicating if hand lever 126 is in the Manual mode position. If the hand lever is in Manual mode, in block 204 the microcontroller reads a voltage input from the hand lever position sensor. In block 205, the microcontroller provides an output to the engine speed actuator setting its position proportional to the hand lever position voltage signal.

If the hand lever is in the Automatic mode, in block 206 the microcontroller reads an input signal from the engine temperature sensor indicating if engine temperature is less than a fixed temperature such as 40 degrees C. If the engine temperature is below 40 degrees C., in block 207 the microcontroller determines if it set the engine speed actuator to a position at least as high as the cold-idle position. If the microcontroller did not already set the engine speed actuator at or above the cold-idle position, in block 208 the microcontroller provides an output to set the engine speed actuator at the cold idle position. If the microcontroller already set the engine speed actuator at least as high as the cold idle position, in block 209 the microcontroller checks an input from the PTO clutch solenoid switch to determine if the PTO is engaged.

If the clutch solenoid input indicates the PTO is not engaged, in block 210 the microcontroller checks a pedal position sensor input to determine if the foot pedal is in the neutral position. If the foot pedal is in the neutral position, the software returns to block 203 and the microcontroller does not update the output to the engine speed actuator. If the foot pedal is not in the neutral position, in block 213 the microcontroller checks the pedal position sensor input to see if the foot pedal is in the forward position. If the foot pedal is in the forward position, in block 214 the microcontroller provides an output to the engine speed actuator proportional to the forward pedal position. If the foot pedal is not in the forward position, in block 215 the microcontroller checks the pedal position sensor input to see if the foot pedal is in the reverse position. If the foot pedal is in the reverse position, in block 216 the microcontroller provides an output to the engine speed actuator proportional to the reverse pedal position. In either the forward or reverse positions, engine speed also should be proportional to pedal position without additional loads. After setting the engine speed actuator and engine speed, or if the foot pedal is not in any of the neutral, forward or reverse positions, the software routine returns to block 203.

Referring again to block 209, if the microcontroller receives an input signal from the PTO clutch solenoid indicating the PTO is engaged, in block 211 the microcontroller determines if it set the engine speed actuator at the boost idle position. If the engine speed actuator was not set at the boost idle position, in block 212 the microcontroller provides an output setting the engine speed actuator at the clutch-idle position. In block 217, the microcontroller checks an input from the engine speed sensor to determine engine speed. In block 218, the microcontroller compares the engine speed to the droop/threshold speed, such as 3100 rpm. If the engine speed is not under the droop threshold, the logic returns to block 203. If the engine speed is under the droop/threshold, in block 219 the microcontroller provides an output to move the engine speed actuator to the full throttle position. Alternatively, the output may move the engine speed actuator a specified amount, or may move the engine speed actuator sufficiently to keep engine speed above the droop/threshold speed.

In block 220, the microcontroller determines if a 30 second timer is set. If not, a 30 second timer is set in block 221. In block 222 the microcontroller determines if the 30 second timer has expired. If the 30 second timer has expired, in block 223 the microcontroller provides an output to the engine speed actuator setting its position back to clutch idle, then returns to block 218. If the 30 second timer has not expired, the logic returns to block 203.

Having described a preferred embodiment, it will become apparent that various modifications can be made without departing from the scope of the invention as defined in the accompanying claims.

The invention claimed is:

1. An electronic engine speed control system for a grass mowing machine powered by an internal combustion engine, comprising:
   a pedal position sensor monitoring the position of a foot pedal and providing an input to a microcontroller corresponding to the foot pedal position;
   a hand lever position sensor monitoring the position of a hand lever, and providing and input to the microcontroller corresponding to the hand lever position, the hand lever position sensor moveable in a range of positions, including a plurality of Manual mode positions and an Automatic mode position; and
   a microcontroller providing an output to an engine speed actuator for the engine based on the hand lever position sensor input if the hand lever is in any of the Manual mode positions, and providing an output to the engine speed actuator based on the pedal position sensor input if the hand lever is in the Automatic mode position.

2. The electronic engine speed control system of claim 1 further comprising:
   an engine speed sensor monitoring the speed of the internal combustion engine and providing an input to the microcontroller corresponding to the engine speed.

3. The electronic engine speed control system of claim 2 further comprising a PTO clutch sensor monitoring the PTO and providing an input to the microcontroller indicating if the PTO is engaged.

4. The electronic engine speed control system of claim 3 wherein the microcontroller boosts engine speed if input from the PTO clutch sensor indicates the PTO is engaged and input from the engine speed monitor is below a droop/threshold speed.

5. The electronic engine speed control system of claim 1 further comprising:
   an engine temperature sensor monitoring the temperature of the internal combustion engine and providing an input to the microcontroller corresponding to the engine temperature.

6. The electronic engine speed control system of claim 4 wherein the microcontroller increases engine speed if input from the engine temperature is below a specified temperature.

7. An electronic engine speed control system for a grass mowing machine powered by an internal combustion engine, comprising:
a microcontroller receiving inputs from a pedal position sensor and a hand lever position sensor, and providing an output to an engine speed actuator for the engine;
the output to the engine speed actuator being based on the input from the hand lever position sensor in a Manual mode, and being based on the input from the pedal position sensor in an Automatic mode.

8. The electronic engine speed control system of claim 7 further comprising a PTO clutch sensor providing an input to the microcontroller indicating if a PTO is engaged.

9. The electronic engine speed control system of claim 8 wherein the microcontroller output to the engine speed actuator in the Automatic mode changes if the PTO clutch sensor input indicates the PTO is engaged.

10. The electronic engine speed control system of claim 8 wherein the microcontroller output to the engine speed actuator in the Automatic mode moves the engine speed actuator to a preferred engine speed position if the PTO clutch sensor input indicates the PTO is engaged.

11. The electronic engine speed control system of claim 7 wherein the microcontroller output to the engine speed actuator in the Automatic mode is proportional to the position of the foot pedal.

12. The electronic engine speed control system of claim 7 further comprising an engine temperature sensor providing an input to the microcontroller indicating if the temperature of the engine is above a threshold temperature.

13. The electronic engine speed control system of claim 7 further comprising an engine speed sensor providing an input to the microcontroller indicating the engine speed.

14. The electronic engine speed control system of claim 13 wherein the microcontroller output to the engine speed actuator in the Automatic mode changes if the PTO is engaged and the engine speed sensor indicates the engine speed droops below a threshold speed.

15. An electronic engine speed control system for a grass mowing machine powered by an internal combustion engine, comprising:
a microcontroller providing an output signal to an engine speed actuator for the engine;
a pedal position sensor connected to a foot pedal and providing a voltage input signal to the microcontroller based on the position of the foot pedal;
a PTO clutch switch providing a signal input to the microcontroller indicating if a PTO clutch is engaged; and
a lever position sensor connected to a hand lever and having a range of positions including an Automatic mode position and a plurality of Manual mode positions, the hand lever position sensor providing a voltage input signal to the microcontroller in the Automatic mode position such that the microcontroller output to the engine speed actuator is related to the voltage inputs from the pedal position sensor and PTO clutch switch, and providing a voltage input signal to the microcontroller in a range of Manual mode positions such that the microcontroller output to the engine speed actuator is related to the voltage input from the lever position sensor.

16. The electronic engine speed control system of claim 15 further comprising an engine temperature sensor connected to the engine and providing a voltage input signal to the microcontroller based on the temperature of the engine.

17. The electronic engine speed control system of claim 15 further comprising an engine speed sensor providing an input signal to the microcontroller based on the rotational speed of the engine.

18. The electronic engine speed control system of claim 17 wherein the microcontroller provides an output to the engine speed actuator in the Automatic mode to increase the engine speed if the PTO clutch switch is engaged and the engine speed sensor input signal indicates the engine rotational speed has drooped below a threshold speed.

19. The electronic engine speed control system of claim 15 wherein the microcontroller provides an output to the engine speed actuator in the Automatic mode to increase the engine speed if the PTO clutch switch indicates the PTO clutch is engaged.

20. The electronic engine speed control system of claim 15 further comprising a hydrostatic transmission operated with the foot pedal.

* * * * *